United States Patent Office 3,003,429
Patented Oct. 10, 1961

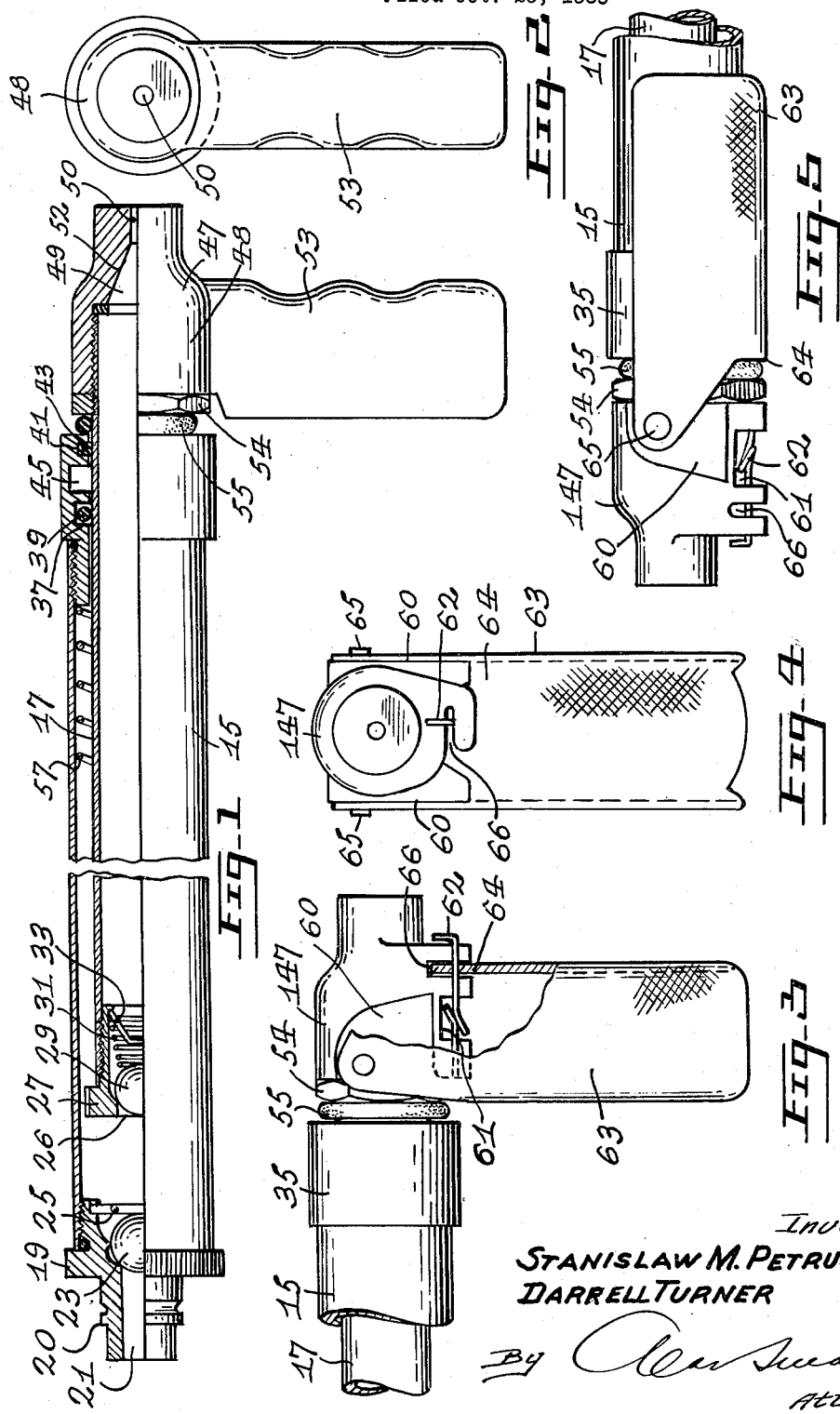

3,003,429
PORTABLE SPRAY PUMP
Stanislaw M. Petrusewicz and Darrell Turner, both of Montreal, Quebec, Canada, assignors to B. J. Coghlin Co., Limited, Montreal, Quebec, Canada, a corporation of Canada
Filed Oct. 29, 1959, Ser. No. 849,650
5 Claims. (Cl. 103—188)

The present invention relates to improvements in the construction of portable manually-operated pumps, for example those designed to be carried by an operator together with a supply of liquid in fire-fighting, agricultural spraying, or the like.

While there are many and varied types of portable pumps of this nature available, these due to their construction present certain disadvantages which are most apparent when the pumps are subjected to rough and prolonged usage, for example as encountered in the fighting of forest fires or the like.

It should be explained that most hand or portable pumps of the type with which the invention is concerned consist essentially of a pair of telescopically or "trombone" interconnected tubes which slide one within the other to provide the suction and discharge action expelling the liquid in a stream or spray. Some of the prior art pump constructions, in order to achieve the necessary liquid seal between the sliding tube portions, utilize some form of piston packing mounted on the inlet end of the inner tube and which bears in sealing relationship against the inner surface of the outer tube. This means that the inner surface of the outer tube must initially be finished within fairly close tolerances and further, if the outer tube is bent or deformed in any way during service the operative seal between the tubes is destroyed in a very short time if the pump can be operated at all. Further, most of the known pump structures are operated by holding the outer tube in one hand and reciprocating the inner tube with the other hand. In some of these structures a grip or handle is provided which is concentric with the inner tube but in many cases the portion of the inner tube protruding beyond the outer tube must be of sufficient length to accommodate a hand grip. This of course means that the overall length of the pump is such that it requires the operator to stretch his arms, which is extremely tiring if carried on for any length of time.

The present invention recognizes these problems and aims to provide an improved pump construction which eliminates the disadvantages mentioned. This is accomplished by providing a construction wherein the inner tube of a pair of "trombone" interconnected tubes is of considerably lesser diameter than the interior of the outer tube providing a clearance space therebetween with a glanded sealing sleeve mounted in the outer tube at the end remote from the fluid inlet to extend inwardly into sealing relationship with the inner tube. With this arrangement, it is not necessary to finish the interior of the outer tube to close tolerances and deformation of the outer tube, as may occur in service, will not affect the working of the inner tube nor the seal between inner and outer. Furthermore, in the preferred construction, the sealing sleeve is provided on its inner surface with three axially spaced apart annular grooves. A sealing ring is mounted in the innermost groove so as to bear against the surface of the inner tube in sealing contact. The second, or central groove, serves as a chamber for grease or the like, while the third or outer groove accommodates a wiper ring also bearing against the inner tube. This arrangement provides a fluid-tight sealing unit which can be easily removed or installed and further, by reason of its construction, eliminates the necessity of increasing friction between the sliding parts to maintain the seal as is common in the usual expanded or pressure ring type of seal. The sealing ring, preferably an "O-ring," is of a fixed diameter, as is also the wiping ring, so that there is a fixed minimum friction between the sliding parts.

In addition, one preferred construction of a hand pump according to the invention is provided with an operating handle that extends transversely of the axis of the pump so that the length of the inner tube, and consequently the overall length of the pump, can be reduced accordingly. This means that the pump can be operated at full stroke without any undue stretch on the part of the operator and moreover makes the pump much easier and less tiring to operate. This handle can be made as a fixed part or extension of the nozzle attached to the inner tube, or alternatively, can be made so as to fold upwardly into alignment with the pump body for convenience in carrying or storage.

Having thus generally described the nature of the invention, particular reference will be made to the accompanying drawings showing by way of illustration a preferred embodiment thereof, and in which:

FIGURE 1 is a view in side elevation and partially in section of a pump construction in accordance with the invention.

FIGURE 2 is a front end elevation of the construction shown in FIGURE 1.

FIGURE 3 is a side elevational view of a front portion of the construction of FIGURE 1 embodying an alternative folding handle.

FIGURE 4 is a front end view of the construction shown in FIGURE 3 to show the locking catch arrangement in more detail.

FIGURE 5 is a view corresponding generally to FIGURES 3 and 4 showing the handle in folded position in alignment with the main pump body.

With particular reference to FIGURE 1 of the drawings, a preferred pump construction is made up of an outer tube 15 in which there is slidably mounted in "trombone" fashion an inner tube 17. The outer tube 15 is provided at one end with an inlet fitting 19 provided with a nipple 20 and an inlet channel 21. A check valve made up of a ball 23 and a retaining bar 25 is provided to control the channel 21. Likewise, the inlet end channel 26 of the inner tube 17 is provided with an inlet fitting 27 and a check valve made up of a ball 29, a spring 31 and a locking ring 33.

A gland nut 35 is threadably mounted in the end remote to the inlet end of the outer tube 15, as shown most clearly in FIGURE 1. The inner side of the nut 35 constitutes a guiding sleeve in which the inner tube 17 is slidable. The inner surface of the sleeve portion of the nut 35 is provided with an annular groove 37 accommodating an O-ring 39 made from a suitable material, for example rubber, synthetic rubber or plastic and adapted to form a fluid seal between the inner and outer tubes 15 and 17. The gland nut 35 is also provided with a groove 41 accommodating a felt wiping ring 43 and between the grooves 37, 41 an annular groove 45 adapted to contain grease for lubricating purposes.

The discharge end of the inner tube 17 is threaded externally at the portion protruding from the outer tube 15 and mounted on this threaded portion is a combined nozzle and handle member 48. The member 48 is made up of a cylindrical portion 47 having an axial recess 49 forming a continuation of the inner diameter of the tube 17 and which tapers inwardly, as indicated at 52, to meet a restricted outlet passage 50, thus providing an internal nozzle. A locking nut 54 is also mounted on the tube 17 against the portion 47 so that it can be locked against axial displacement.

In the construction illustrated, a pistol-grip type of handle 53 extends transaxially outwards from the portion 47 to provide a convenient sure grip for the operation of the pump. In the form of the invention shown, the part 47 and the part 53 are die cast as a unit, for example from light metal, aluminum or plastic material. Alternatively, this assembly could be made in two parts, e.g. the tubular portion 47 could be from metal and appropriately formed to be assembled with the handle 53 made from plastic.

To provide shock absorbing elements between the inner 17 and outer 15 tubes a spring 57 mounted over the inner tube 17 and an O ring 55 of resilient material is mounted on the inner tube 17 between the locking nut 54 and the gland nut 35.

In an alternative preferred form of the invention, as shown in FIGURES 3, 4 and 5, the cylindrical portion 147 is modified to provide flat side faces 60, and an internal recess 61 adapted to receive a retention spring 62. The handle portion 63 in this construction is of substantially U-shaped cross-section and is hingedly connected as indicated at 65 to the side faces 60 of the portion 147. The upper end 64 of the handle portion 63 fits within a further slotted recess 66 provided in the portion 147 and is shaped so as to engage and be retained by the retention spring 62. As is shown in FIGURE 5, by clearing the spring 62 from engagement with the handle end 64 the handle can be folded up into alignment with the tubes 15, 17.

As previously mentioned, there are definite advantages in the present construction as compared with the standard pumps now on the market. The location of the sealing assembly as a unit between the associated tubes at the end remote from the inlet end and mounted on the exterior tube makes it much easier to install and maintain in addition to eliminating the problem of seizing through damage to the outer tube. In the present case, the inlet end of the inner tube does not touch the outer tube and in fact there is a clearance between the tubes, so that even if the outer tube does become dented this will not affect the sliding action of the inner tube. As previously described, the present sealing unit, by reason of its construction, is not dependent on tightening or expansion to achieve sealing between the inner and outer tubes and therefore is free of the inherent increase of friction. Further, the present sealing arrangement eliminates the possibility of a faulty seal by over or under tightening as may occur in the known types of pressure seals. Still further, the present handle construction in addition to making it possible to considerably shorten the overall length of the pump also makes for a considerably easier operation. The pistol-grip type of handle is more readily grasped than a tubular handle because the tension is taken off the fingers and the handle is gripped in a more natural position.

We claim:

1. A portable spray pump comprising a pair of telescopically interconnected inner and outer tubes, an inlet at one end of said outer tube and a check valve mounted in said inlet adapted to permit entry flow only to said outer tube, said inner tube fitting into said outer tube from the end remote from said inlet and having a check valve at the end adjacent said outer tube inlet adapted to permit entry flow to said inner tube during reciprocal movement towards said inlet, said inner tube being located in concentric spaced relationship within said outer tube and a sealing gland nut sleeve mounted in said outer tube end remote from said inlet end and including an inner cylindrical surface extending concentrically inwardly of said outer tube so as to surround the exterior surface of said inner tube and slidably maintain said inner tube in said concentric spaced relationship with said outer tube, said sealing gland nut sleeve inner surface being provided with three axially spaced annular grooves, a sealing ring mounted in one of said grooves, a wiping ring mounted in another of said grooves with the third groove located between said other two grooves being adapted to provide a lubricant containing chamber, a discharge outlet member mounted on the end of said inner tube remote from said check valve and protruding beyond said sealing sleeve, and a handle portion connected to said inner tube protruding end.

2. A portable spray pump as claimed in claim 1, wherein said handle member is fixedly attached to said protruding inner tube end and extends transversely outwards from the axis thereof.

3. A portable spray pump as claimed in claim 1, wherein said handle member is hingedly connected to said protruding inner tube end and is adapted for folding from a first position extending transversely from the axis of said inner tube into a second position in alignment with said axis.

4. A portable spray pump comprising a pair of telescopically interconnected inner and outer tubes disposed in concentric spaced relationship, an inlet at one end of said outer tube and a check valve adapted to permit entry flow only to said outer tube, said inner tube fitting into said outer tube from the end remote from said inlet and having a check valve at the end adjacent said outer tube inlet adapted to permit entry flow to said inner tube during reciprocal movement towards said inlet, a sealing gland nut sleeve mounted in said tube outer end remote from said inlet and including an inner surface extending concentrically inwardly of said outer tube so as to surround the exterior surface of said inner tube, said sealing gland nut sleeve being provided with three axially spaced grooves, a sealing ring within one of said grooves adapted to bear on said inner tube, a wiping ring mounted in the other of said grooves, with the third groove between said other two grooves being adapted to provide a lubricant containing chamber, a discharge outlet member mounted on the end of said inner tube protruding beyond said sealing sleeve and including a restricted axial flow discharge outlet, and a handle portion connected to said inner tube adjacent said discharge outlet member.

5. A portable spray pump comprising a pair of telescopically interconnected inner and outer tubes, said inner and outer tubes being disposed in concentric spaced relationship, an inlet at one end of said outer tube and a check valve adapted to permit entry flow only to said outer tube, said inner tube fitting into said outer tube from the end remote from said inlet and having a check valve at the end adjacent said outer tube inlet adapted to permit entry flow to said inner tube during reciprocal movement towards said inlet, a sealing gland nut sleeve mounted in said outer tube end remote from said inlet and including an inner surface extending concentrically inwardly of said outer tube so as to surround the exterior surface of said inner tube, at least one sealing ring mounted within said gland nut sleeve inner surface and adapted to bear on said inner tube, a discharge outlet member mounted on the end of said inner tube protruding beyond said sealing sleeve and including a restricted axial fluid discharge outlet, and a handle portion connected to said inner tube adjacent said discharge outlet member, said handle portion being hingedly connected to said discharge outlet member and adapted for folding from a first position extending transaxially from said outlet member into a second position in alignment with said inner and outer tubes.

References Cited in the file of this patent

UNITED STATES PATENTS

| | | |
|---|---|---|
| 139,263 | Robins | May 27, 1873 |
| 785,154 | Cordeau | Mar. 21, 1905 |
| 1,752,546 | Allerton | Apr. 1, 1930 |
| 1,999,655 | Coyle | Apr. 30, 1935 |
| 2,396,878 | Plumb | Mar. 19, 1946 |
| 2,557,247 | Ziherl | June 19, 1951 |
| 2,649,335 | Funke | Aug. 18, 1953 |

FOREIGN PATENTS

| | | |
|---|---|---|
| 450,645 | Great Britain | July 22, 1936 |
| 491,979 | Italy | Mar. 13, 1954 |